United States Patent Office 3,657,214
Patented Apr. 18, 1972

3,657,214
MONOAZO DYESTUFFS CONTAINING A
PYRIDYL GROUP
Alistair Howard Berrie and Nigel Hughes, Manchester, England, assignors to Imperial Chemical Industries Limited, London, England
No Drawing. Filed June 23, 1969, Ser. No. 835,752
Claims priority, application Great Britain, June 27, 1968, 30,761/68
Int. Cl. C09b 29/36
U.S. Cl. 260—156                                   3 Claims

ABSTRACT OF THE DISCLOSURE

Water-insoluble monoazo dyestuffs of the formula:

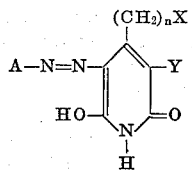

wherein A is optionally substituted aryl, $n$ is 0 or 1, X is —CN, —COOR, —COR or —CONR$^1$R$^2$, Y is —CN, —COOR, —COR, —CONR$^1$R$^2$ or alkyl or aryl, R is optionally substituted alkyl or aryl and R$^1$ and R$^2$ are each independently hydrogen or optionally substituted alkyl or aryl, and the use of the dyestuffs for colouring synthetic textile materials.

---

This invention relates to water-insoluble monoazo dyestuffs which are valuable for colouring synthetic textile materials in particular aromatic polyester textile materials.

According to the invention there are provided the water-insoluble monoazo dyestuffs free from sulphonic acid and carboxylic acid groups and which, in one of the possible tautomeric forms, are represented by the formula:

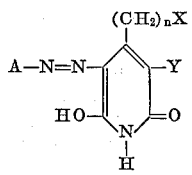

wherein A is an optionally substituted aryl radical, $n$ is 0 or 1, X is a —CN, —COOR, —COR or —CONR$^1$R$^2$ radical, Y is a —CN, —COOR, —COR and —CONR$^1$R$^2$ radical or an alkyl or aryl radical, R is an optionally substituted alkyl or aryl radical, and R$^1$ and R$^2$ each independently represent a hydrogen atom or an optionally substituted alkyl or aryl radical or R$^1$ and R$^2$ together form with the nitrogen atom a 5- or 6-membered nitrogen-containing heterocyclic ring.

The monoazo dyestuffs of the invention can exist in a number of possible tautomeric forms. For convenience the dyestuffs have only been formulated in one of these forms, but it is to be understood that the specification relates to the dyestuffs in any of the possible tautomeric forms.

As examples of the optionally substituted aryl radicals represented by A there may be mentioned optionally substituted naphthyl radicals and preferably optionally substituted phenyl radicals, in particular phenyl radicals substituted by one or more of the same or different substituents such as chlorine, bromine, nitro, cyano, lower alkyl such as methyl, lower alkoxy such as methoxy, trifluoromethyl, lower alkylsulphonyl, lower alkylcarbonyl, carbo lower alkoxy such as carboethoxy which may be substituted by hydroxy or ower alkoxy groups, sulphon-substituted by hydroxy or lower alkoxy groups, sulphonamido, carbonamido and N-lower alkyl and N:N-di(lower alkyl) derivatives thereof, di(lower alkyl)amino, phenyl, and phthalyl which is combined with the phenyl radical to form an anthraquinone radical.

Throughout this specification the terms "lower alkyl" and "lower alkoxy" are used to denote alkyl and alkoxy radicals respectively containing from 1 to 4 carbon atoms.

The alkyl radicals represented by R, R$^1$, R$^2$ and Y are preferably lower alkyl radicals such as methyl, ethyl, n-propyl and n-butyl. As examples of the substituted alkyl radicals represented by R, R$^1$ and R$^2$ there may be mentioned hydroxy lower alkyl radicals such as β-hydroxyethyl and β- or γ-(hydroxypropyl), phenyl lower alkyl radicals such as benzyl and β-phenylethyl, lower alkoxy lower alkyl radicals such as β-(methoxy or ethoxy) ethyl, and optionally substituted phenyl radicals such as phenyl itself and tolyl, chlorophenyl, anisyl, bromophenyl and dimethylphenyl.

As examples of the 5- and 6-membered nitrogen-containing heterocyclic rings formed by joining together R$^1$, R$^2$ and the nitrogen atom there may be mentioned morpholino, piperidino and pyrrolidino.

According to a further feature of the invention there is provided a process for the manufacture of the water-insoluble monoazo dyestuffs of the invention which comprises coupling a diazo compound of an amine of the formula A—NH$_2$ with a coupling component of the formula:

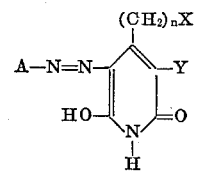

wherein A, Y, $n$ and X have the meanings stated, the amine and coupling component being free from carboxylic acid and sulphonic acid groups.

The process of the invention can be conveniently carried out by adding the diazo compound, which can for example be in the form of a solution or suspension in an aqueous acidic medium, to a solution or suspension of the coupling component in water and/or a water-soluble organic liquid optionally containing an inorganic acid or an alkali metal hydroxide or carbonate, if necessary adjusting the pH of the mixture to effect coupling, and thereafter isolating the resulting dyestuff by conventional methods.

As examples of the amines of the formula A—NH$_2$ there may be mentioned aniline, o-, m- or p-toluidine,
o-, m- or p-anisidine,
o-, m- or p-chloroaniline,
o-, m- or p-bromoaniline,
o-, m- or p-nitroaniline,
2:5-dichloroaniline,
2:4-dinitroaniline,
2:6-dinitroaniline,
2:4-dinitro-6-(chloro or bromo)aniline,
4-methanesulphonylaniline,
4-aminobenzotrifluoride,
4- or 5-nitro-2-toluidine,
4- or 5-nitro-2-anisidine,
4- or 5-chloro-2-anisidine, 4- or 5-chloro-2-toluidine,
4- or 5-bromo-2-anisidine,
2:6-di(chloro- or bromo-)-4-nitroaniline,
2:4:6-trinitroaniline,
2:4-dinitro-6-carbomethoxyaniline,
2-amino-5-nitrobenzotrifluoride,
2:4-bis(methanesulphonyl)aniline,
2-(chloro- or bromo-)-4-nitroaniline,
methylanthranilate,
4- or 5-nitromethylanthranilate,
4-aminobenzamide,
2:6-di(chloro- or bromo)-aniline-4-sulphonamide,
2:6-di(chloro- or bromo-)-4-methylsulphonylaniline,
2:5-di(chloro- or bromo-)-4:6-dinitroaniline,
2-amino-3:5-dinitrobenzotrifluoride,
3-amino-2-(chloro- or bromo-)-4:6-dinitro-(toluene or anisole),
3-amino-4-(chloro- or bromo)-2:6-dinitro(toluene or anisole),
2 or 4-cyanoaniline,
4-nitro-2-cyanoaniline,
2:4-dinitro-6-cyanoaniline,
2-nitro-4-cyanoaniline,
2-chloro-4-cyanoaniline,
3-amino-2:4:6-trinitrotoluene,
2-(chloro- or bromo-)-4-methylsulphonylaniline,
3-(chloro- or bromo-)-4-thiocyanatoaniline,
2-(chloro- or bromo-)-4-sulphamylaniline,
2-amino-5-nitrophenylmethanesulphone,
2-amino-3:5-dinitrophenylmethylsulphone,
2-amino-3-(chloro- or bromo-)-5-nitrophenylmethylsulphone,
2-sulphamyl-4-nitroaniline,
2-ethylsulphamyl-4-nitroaniline,
2-butylsulphamyl-4-nitroaniline,
2-dimethylsulphamyl-4-nitroaniline,
2-methylsulphamyl-4:6-dinitroaniline,
2-methylsulphamyl-4-nitro-6-(chloro- or bromo-)-aniline,
2-phenylsulphamyl-4-nitroaniline,
methyl 2-amino-3-(chloro- or bromo-)-5-nitrobenzoate,
ethyl-4-aminobenzoate,
β-hydroxyethyl-4-aminobenzoate,
β-methoxyethyl-4-aminobenzoate dimethyl 2-aminoterephthalate,
dimethyl 2-amino-5-nitroterephthalate,
β-(β'-ethoxyethoxy)ethyl 4-aminobenzoate,
aniline-2-, 3- or 4-sulphamate,
2-amino-4-chlorophenylsulphamate,
aniline-2-, 3- or 4-N:N-dimethylsulphamate,
4-aminodiphenyl,
1-naphthylamine and
1- or 2-aminoanthraquinone.

The coupling components of Formula I may themselves be obtained by a number of methods such as are described in, for example, "Heterocyclic Compounds—Pyridine and its Derivatives—Part 3," which was edited by Klingsberg and published by Interscience Publishers in 1962. For example by cyclisation of ester, nitrile or N:N-disubstituted amide derivatives of the appropriately $\alpha:\beta$-substituted glutaconic acid.

As specific examples of the said coupling components there may be mentioned

2:6-dihydroxy-3-cyano-4-carboethoxy pyridine,
2:6-dihydroxy-3-cyano-4-carbamoyl pyridine,
ethyl 2:6-dihydroxy-3-cyano-pyrid-4-ylacetate,
2:6-dihydroxy-3-cyano-pyrid-4-yl acetamide,
2:6-dihydroxy-3-cyanopyrid-4-yl acetdiethyl amide,
2:6-dihydroxy-3:4-di(carboethoxy)pyridine,
2:6-dihydroxy-3-carbamoyl-4-carbethoxy pyridine, and
2:6-dihydroxy 3:4-di(carbamoyl) pyridine.

One preferred class of the monoazo dyestuffs of the invention comprises the dyestuffs wherein A is an optionally substituted phenyl radical.

A second preferred class comprises the dyestuffs of the formula:

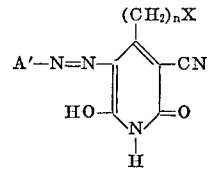

wherein $n$ and X have the meanings stated and $A^1$ is an optionally substituted phenyl radical.

The water-insoluble monoazo dyestuffs of the invention are valuable for colouring synthetic textile materials, in particular cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn or woven or knitted fabric.

Such textile materials can conveniently be coloured with the monazo dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85° C.; in the case of cellulose triacetate or polyamide textile material it is preferred to carry out the dyeing process at 95° to 100° C.; in the case of aromatic polyester textile materials the dyeing process can either be carried out at a temperature between 90° and 100° C. preferably in the presence of a carrier such as diphenyl or o-hydroxydiphenyl, or at a temperature above 100° C., preferably at a temperature between 120° and 130° C., under superatmospheric pressure.

Alternatively the aqueous dispersion of the said monoazo dyestuff can be applied to the textile material by a padding or printing process, followed by heating or steaming of the textile material. In such processes it is preferred to incorporate a thickening agent, such as gum tragacanth, gum arabic, or sodium alginate, into the aqueous dispersion of the said monoazo dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The monoazo dyestuffs have excellent affinity and building up properties on synthetic textile materials, and in particular on aromatic polyester textile materials, so enabling heavy depths of shade to be obtained. The resulting colorations which range in shade from yellow to violet, have excellent fastness to light, to wet treatments, and, in particular, to dry heat treatments such as those carried out at high temperatures during pleating operations.

If desired the dyestuffs of the invention can be applied to synthetic textile materials in conjunction with other dispersed dyes, such as are described in, for example, British specifications Nos. 806,271; 835,819; 840,903; 847,175; 852,396; 852,493; 859,899; 865,328; 872,204; 894,012; 908,656; 909,843; 910,306; 913,856; 919,424; 944,513; 944,722; 953,887; 595,816; 960,235 and 916,412.

The invention is illustrated but not limited by the following example in which the parts are by weight:

EXAMPLE 1

5 parts of a 140% aqueous solution of sodium nitrite are added with stirring to a solution of 2.16 parts of aniline 3-N:N-dimethylsulphamate in a mixture of 50 parts of water and 2.5 parts of a concentrated aqueous solution of hydrochloric acid, at a temperature between 0° and 5° C., and the mixture is stirred for 15 minutes at the same temperature.

The resulting solution of the diazo compound is added during 15 minutes to a solution of 2.25 parts of ethyl 2:6-dihydroxy-3-cyanopyrid-4-ylacetate and 5 parts of sodium acetate in 110 parts of a 0.8% aqueous solution of sodium hydroxide, the temperature being maintained between 0° and 5° C. by external cooling. The mixture is stirred for a further 15 minutes, acidified with acetic acid, and the precipitated dyestuff is filtered off, washed with water and dried.

When dispersed in aqueous medium the dyestuff dyes aromatic polyester textile materials in deep greenish-yellow shades of excellent fastness properties.

The following table gives further examples of the dyestuffs of the invention which are obtained by diazotising the amines listed in the second column of the table and coupling the resulting diazo compounds with the coupling components listed in the third column of the table using methods similar to that described in Example 1. The fourth column of the table indicates the shades obtained when the dyestuffs are applied to polyester textile materials.

Ethyl 2:6-dihydroxy-3-cyanopyrid-4-ylacetate and 2:6-dihydroxy-3-cyano-4-carboethoxypyridine were obtained by the methods described in volume 65 of the Journal of the American Chemical Society at page 449.

2:6-dihydroxy-3-cyano-4-cyanomethylpyridine was obtained by condensing ethyl-3-oxo-4-cyanobutanoate with cyanacetamide in the presence of piperidine.

2:6-dihydroxy-3-cyano-4-(benzoylmethyl or p-methoxybenzoylmethyl)pyridine were obtained by condensing ethyl-3-oxo-4-(benzoyl or p-methoxybenzoyl)butadiene with cyanacetamide in the presence of piperidine.

Ethyl 2:6-dihydroxy-3-cyanopyrid-4-ylacetate on reaction with ammonia, ethylamine, diethylamine, aniline, p-anisidine and piperidine gave the corresponding 4-carbamoylmethyl compounds.

Ethyl 2:6-dihydroxy-3-acetylpyrid-4-ylacetate was ob-

| Example | Amine | Coupling component | Shade |
|---|---|---|---|
| 2 | 2-chloroaniline | Ethyl 2:6-dihydroxy-3-cyanopyrid-4-ylacetate | Greenish-yellow. |
| 3 | 4-chloroaniline | do | Do. |
| 4 | 2-nitroaniline | do | Do. |
| 5 | 3-nitroaniline | do | Do. |
| 6 | 4-nitroaniline | do | Do. |
| 7 | 2-anisidine | do | Reddish-yellow. |
| 8 | 4-toluidine | do | Yellow. |
| 9 | Ethyl 4-aminobenzoate | do | Greenish-yellow. |
| 10 | β-Methoxyethyl 3-aminobenzoate | do | Do. |
| 11 | 1-naphthylamine | do | Reddish-yellow. |
| 12 | 1-aminoanthraquinone | do | Do. |
| 13 | 4-aminodiphenyl | do | Yellow. |
| 14 | Aniline | do | Do. |
| 15 | 4-methyl-2-nitroaniline | do | Reddish-yellow. |
| 16 | 4-methoxy-2-nitroaniline | do | Orange. |
| 17 | 4-chloro-2-nitroaniline | do | Greenish-yellow. |
| 18 | 2-chloro-4-nitroaniline | do | Do. |
| 19 | 4-cyanoaniline | do | Do. |
| 20 | 4-dimethylaminoaniline | do | Violet. |
| 21 | 2:4-dichloroaniline | do | Greenish-yellow. |
| 22 | 2:5-dichloroaniline | do | Do. |
| 23 | 2:4:5-trichloroaniline | do | Do. |
| 24 | 2:4:6-trichloroaniline | do | Yellow. |
| 25 | 4-chloroaniline | 2:6-dihydroxy-3-cyano-4-carboethoxy pyridine | Greenish-yellow. |
| 26 | 2-nitroaniline | do | Do. |
| 27 | do | 2:6-dihydroxy-3-cyano-4-cyanomethylpyridine | Do. |
| 28 | 4-chloroaniline | do | Do. |
| 29 | do | 2:6-dihydroxy-3-cyano-4-(carbo-B-ethoxyethoxy)pyridine | Do. |
| 30 | 2-nitroaniline | do | Do. |
| 31 | do | 2:6-dihydroxy-3-cyano-4-benzoylmethyl pyridine | Do. |
| 32 | 4-chloroaniline | do | Do. |
| 33 | do | 2:6-dihydroxy-3-cyano-4-(p-methoxybenzoylmethyl)pyridine | Do. |
| 34 | 2-nitroaniline | do | Do. |
| 35 | do | 2:6-dihydroxy-3-cyano-4-(carbamoylmethyl)pyridine | Do. |
| 36 | 4-chloroaniline | do | Do. |
| 37 | do | 2:6-dihydroxy-3-cyano-4-(N-ethylcarbamoylmethyl)pyridine | Do. |
| 38 | 2-nitroaniline | do | Do. |
| 39 | do | 2:6-dihydroxy-3-cyano-4-(N:N-diethylcarbamoylmethyl)pyridine | Do. |
| 40 | 4-chloroaniline | do | Do. |
| 41 | do | 2:6-dihydroxy-3-cyano-4-(N-phenylcarbamoylmethyl)pyridine | Do. |
| 42 | 2-nitroaniline | do | Do. |
| 43 | Ethyl 4-aminobenzoate | do | Do. |
| 44 | 4-methoxy-2-nitroaniline | do | Orange. |
| 45 | 4-chloroaniline | 2:6-dihydroxy-3-cyano-4-(N-p-methoxyphenylcarbamoylmethyl)pyridine | Greenish-yellow |
| 46 | 2-nitroaniline | do | Do. |
| 47 | do | 2:6-dihydroxy-3-cyano-4-(N-piperidin-1'-yl-carbonylmethyl)pyridine | Do. |
| 48 | 4-chloroaniline | do | Do. |
| 49 | do | Ethyl 2:6-dihydroxy-3-acetylpyrid-4-ylacetate | Do. |
| 50 | 2-nitroaniline | do | Do. |
| 51 | do | Ethyl 2:6-dihydroxy-3-carboethoxypyrid-4-yl-acetate | Do. |
| 52 | 4-chloroaniline | do | Do. |
| 53 | do | Ethyl 2:6-dihydroxy-3-carbamoylpyrid-4-yl-acetate | Do. |
| 54 | 2-nitroaniline | do | Do. |
| 55 | 4-chloroaniline | Ethyl 2:6-dihydroxy-3-methylpyrid-4-ylacetate | Do. |
| 56 | Ethyl 4-aminobenzoate | do | Do. |
| 57 | 4-methoxy-2-nitroaniline | do | Orange. |
| 58 | 4-nitroaniline | Ethyl 2:6 dihydroxy-3-phenylpyrid-4-ylacetate | Greenish-yellow. |
| 59 | 4-methyl-2-nitroaniline | do | Reddish-yellow. |
| 60 | 2-bromo-4-nitroaniline | Ethyl 2:6-dihydroxy-3-cyanopyrid-4-ylacetate | Greenish-yellow. |
| 61 | 4-methylsulphonylaniline | do | Do. |
| 62 | Aniline-4-sulphonamide | do | Do. |
| 63 | 4-aminobenzamide | do | Do. |
| 64 | 4-acetylaniline | do | Do. |
| 65 | 2-trifluoromethylaniline | do | Do. |
| 66 | 4-acetylaminoaniline | do | Reddish-yellow. |
| 67 | 3-nitroaniline | 2:6-dihydroxy-3-cyano-4-phenoxycarbonylpyridine | Greenish-yellow. |
| 68 | 2-chloroaniline | do | Do. |
| 69 | do | 2:6-dihydroxy-3:4-dicyanopyridine | Do. |
| 70 | 2-nitro-4-methoxyaniline | do | Orange. |
| 71 | 4-nitroaniline | 2:6-dihydroxy-3-N-ethylcarbamoyl-4-(N-ethylcarbamoylmethyl)pyridine | Greenish-yellow. |
| 72 | 3-chloroaniline | do | Do. |
| 73 | 4-aminobenzamide | 2:6-dihydroxy-3-phenoxycarbonyl-4-(phenoxycarbonylmethyl)pyridine | Do. |
| 74 | 2-bromo-4-nitroaniline | do | Do. |
| 75 | 2-nitroaniline | 2:6-dihydroxy-3-benzoyl-4-carboethoxypyridine | Do. |
| 76 | 2:4-dichloroaniline | do | Do. | tained by condensing ethylacetonedicarboxylate with acetoacetamide in the presence of triethylamine.

Ethyl 2:6-dihydroxy-3-carboethoxypyrid-4-ylacetate was obtained by condensing together equimolecular proportions of ethylacetone dicarboxylate, diethylmalonate and ammonia in the presence of triethylamine.

Ethyl 2:6-dihydroxy-3-carbamoylpyrid-4-ylacetate was obtained by condensing ethylacetone dicarboxylate with malonodiamide in the presence of piperidine.

Ethyl 2:6-dihydroxy-3-(methyl or phenyl)pyrid-4-yl-acetate were obtained by cyclisation of β-(methyl or phenyl)-β-ethoxycarbonylmethylglutaconamide in sulphuric acid.

2:6-dihydroxy-3-cyano - 4 - carboethoxypyridine on transesterification with β-ethoxyethanol gave 2:6-dihydroxy-3-cyano-4-(carbo-B-ethoxyethoxy)pyridine.

2:6 dihydroxy-3-cyano-4-phenoxycarbonylpyridine was obtained by transesterification of 2:6-dihydroxy-3-cyano-4-carboxypyridine with phenol.

2:6 dihydroxy-3:4-dicyanopyridine was obtained by dehydration of 2:6-dihydroxy-3-cyano-4-carbamoylpyridine using $P_2O_5$.

2:6 - dihydroxy - 3 - N - ethylcarbamoyl-4-(N-ethylcarbamoylmethyl)pyridine was obtained by heating ethyl 2:6-dihydroxy-3-carboethoxypyrid - 4 - ylacetate with ethylamine; and the same ester on transesterification with phenol afforded 2:6-dihydroxy-3 - phenoxycarbonyl - 4-(phenoxycarbonylmethyl)pyridine.

2:6-dihydroxy-3-benzoyl-4-carboethoxypyridine was obtained by treating ethyl citrazinate with benzoylchloride in the presence of aluminium chloride.

We claim:

1. Water-insoluble monoazo dyestuff free from sulphonic acid and carboxylic acid groups having the general formula

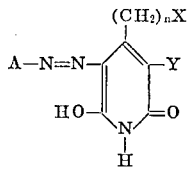

wherein A is selected from the group consisting of phenyl, naphthyl and phenyl substituted with a member selected from the group consisting of chlorine, bromine, nitro, cyano, lower alkyl, lower alkoxy, trifluoromethyl, lower alkylsulphonyl, lower alkycarbamyl, carbo lower alkoxy, sulphonamido, N-lower alkyl sulphonamido, N:N-di (lower alkyl) sulphonamido, carbonamido, N-lower alkyl carbonamido, N:N-di(lower alkyl)carbonamido, di(lower alkyl)amino, phenyl and phthalyl; $n$ is an integer of 0–1; X is selected from the group consisting of —C≡N, —COR and —CONR$^1$R$^2$; Y is selected from the group consisting of —C≡N, —COOR, —COR, —CONR$^1$R$^2$, lower alkyl and phenyl; R is selected from the group consisting of lower alkyl, hydroxy lower alkyl, lower alkoxy lower alkyl, pheny and methoxypheny; and R$^1$ and R$^2$ each independently are selected from the group consisting of hydrogen, lower alkyl, phenyl and methoxyphenyl and R$^1$ and R$^2$ together with the nitrogen atom to which they are attached form the ring selected from the group consisting of morpholino, piperidino and pyrrolidino rings.

2. The water-insoluble monoazo dyestuff of claim 1 wherein R$^1$ and R$^2$ together with the nitrogen atom to which they are attached form the piperidino ring.

3. The water-insoluble monoazo dyestuff of claim 1 having the formula

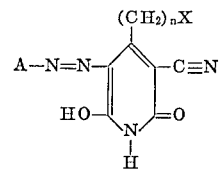

wherein A, X and $n$ have the meaning given in claim 1.

References Cited
UNITED STATES PATENTS
3,487,066   12/1969   Ritter et al. _____ 260—156

JOSEPH REBOLD, Primary Examiner

D. M. PAPUGA, Assistant Examiner

U.S. Cl. X.R.

260—247.2 A, 293.69, 294.9, 295.5 A, 295.5 R, 296 R